United States Patent [19]

Yanagisawa et al.

[11] Patent Number: 5,204,220
[45] Date of Patent: Apr. 20, 1993

[54] OPTICAL RECORDING MEDIUM

[75] Inventors: Shuichi Yanagisawa; Tatsuro Sakai; Takashi Chuman; Yasushi Araki; Fumio Matsui, all of Saitama, Japan

[73] Assignee: Pioneer Electronic Corporation, Tokyo, Japan

[21] Appl. No.: 690,474

[22] Filed: Apr. 24, 1991

[30] Foreign Application Priority Data

Oct. 9, 1990 [JP] Japan .................. 2-270709

[51] Int. Cl.⁵ .......................... G03C 1/72; B41M 5/24
[52] U.S. Cl. .................................... 430/275; 430/276; 430/278; 430/495; 430/945; 346/135.1
[58] Field of Search ............... 430/270, 271, 275, 276, 430/495, 945, 278; 346/135.1

[56] References Cited

U.S. PATENT DOCUMENTS 4,626,496 12/1986 Sato ....................... 430/270
4,652,514 3/1987 Abe et al. ................ 430/343
4,767,693 8/1988 Oba et al. ................ 430/270

FOREIGN PATENT DOCUMENTS 0353393 2/1990 European Pat. Off. .
0353394 2/1990 European Pat. Off. .
0201243 11/1984 Japan ..................... 430/270
1040390 2/1989 Japan ..................... 430/945

Primary Examiner—Lee C. Wright
Attorney, Agent, or Firm—Sughrue, Mion, Zinn, Macpeak & Seas

[57] ABSTRACT

An optical recording medium comprises a light transmissive substrate, a light absorption layer provided on the light transmissive substrate and a light reflecting layer provided on the light absorption layer. The light absorption layer contains a cyanine type dye represented by a following structural formula:

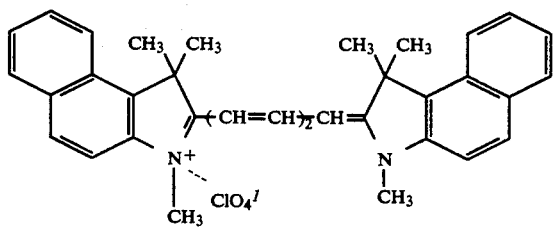

and a quencher represented by a following general formula:

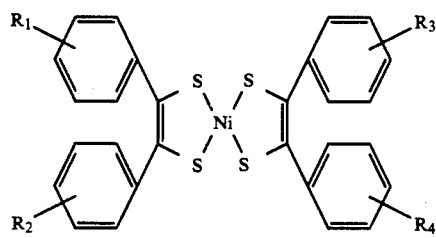

wherein $R_1$, $R_2$, $R_3$ and $R_4$ denote hydrogen or substituent group, respectively. A protective layer may be further provided on the light reflecting layer for protecting the same.

3 Claims, 3 Drawing Sheets

OPTICAL RECORDING MEDIUM

BACKGROUND OF THE INVENTION

The present invention relates to an optical recording medium, and more particularly to a writable optical recording medium having a light transmissive substrate on which a light absorption layer for absorbing a laser beam and a light reflecting layer for reflecting the laser beam are formed.

In the prior art, an organic coloring matter such as cyanine type dye or phthalocyanine type dye is generally well known as a recording film of a writable optical recording medium.

A writing method for such an optical recording medium is generally carried out by converging laser beams to a micro-area of the recording film and then converting the light energy to the heat energy, thereby to denature, i.e. form a pit, the recording film. In order to smoothly perform the denaturing operation of the recording film, two sheets, each composed of a substrate and a recording film which is disposed on the substrate, are generally prepared so that the respective recording films are opposed to each other as structure of the recording medium, a so-called air-sandwich structure.

The laser beam utilized in a writing method for the optical recording mediums of the structure described above is irradiated through the transmissive substrate, thereby forming a light readably pit in the recording film. The laser beam for the reading for reproducing data stored in the recording film has an output power less than that of the laser beam for the writing. By using the laser beam for the reading, the contrast between a portion in which the pit is formed and a portion in which the pit is not formed is read out as an electric signal.

In the prior art, there is also known a recoding medium of a so-called ROM (Read Only Memory)-type in which data is preliminarily recorded, being different from the above described type recording medium. Such ROM-type recording medium has been widely utilized in practical use in an audio record and information processing technology and is not provided with a writable recording film. Namely, prepits and pregrooves corresponding to the data to be reproduced are preliminarily formed on a plastic substrate by a press forming method and a reflecting layer made of metal such as gold (Au), silver (Ag), copper (Cu), aluminium (Al) and the like is formed on the plastic substrate. A protective layer is further formed on the reflecting layer. A typical example of such ROM-type recording medium is a compact disk so-called CD. The specification of recording and reading signals of the CD is standardized, and a reproducing device of the CD has been widely utilized in accordance with this standard as a compact disk player, i.e. a CD player.

The writable optical recording medium is similar to the CD in their shapes and in the utilization of the laser beam. Accordingly, it is a strong desire to develop the writable recording medium which is directly utilized for the CD player without making any change or modification.

However, the conventional writable recording medium having no air-sandwich structure, which is merely provided with a light reflection layer on the conventional recording film, has a reflection coefficient of the laser beam and a modulation rate insufficient for the CD standards. In addition, the durability against the optical degradation is also required.

SUMMARY OF THE INVENTION

An object of the present invention is to substantially eliminate the defects or drawbacks encountered in the prior art and to provide a writable optical recording medium having a high reflection coefficient and a high modulation rate enough to meet the CD standards and having a durability against an optical degradation.

This and other objects can be achieved according to the present invention by providing an optical recording medium which comprises a light transmissive substrate, a light absorption layer provided on the light transmissive substrate and light reflecting layer provided on the light absorption layer, the light absorption layer containing a cyanine type dye represented by a following structural formula:

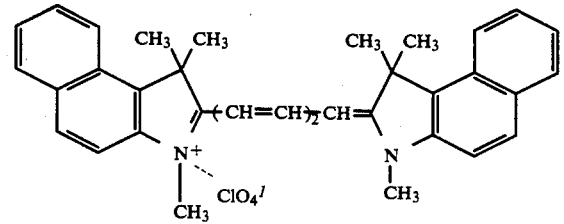

and a quencher represented by a following general formula:

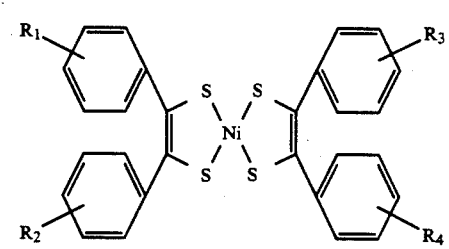

wherein $R_1$, $R_2$, $R_3$ and $R_4$ denote hydrogen or substituent group, respectively.

In a preferred embodiment, the quencher may have the following structural formula:

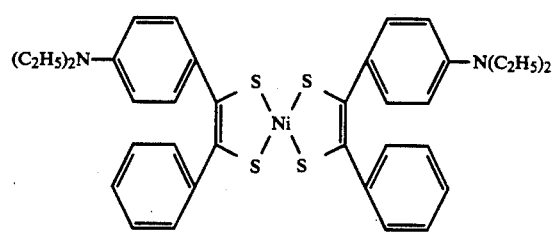

A protective layer may be further provided on the laminated light absorption layer and light reflecting layer for protecting the same.

According to the optical recording medium of the present invention of the characters described above, the high reflection coefficient and a high modulation rate enough to meet the CD standards can be achieved and the durability against an optical degradation.

DESCRIPTION OF THE PREFERRED EMBODIMENT

Figure 1:
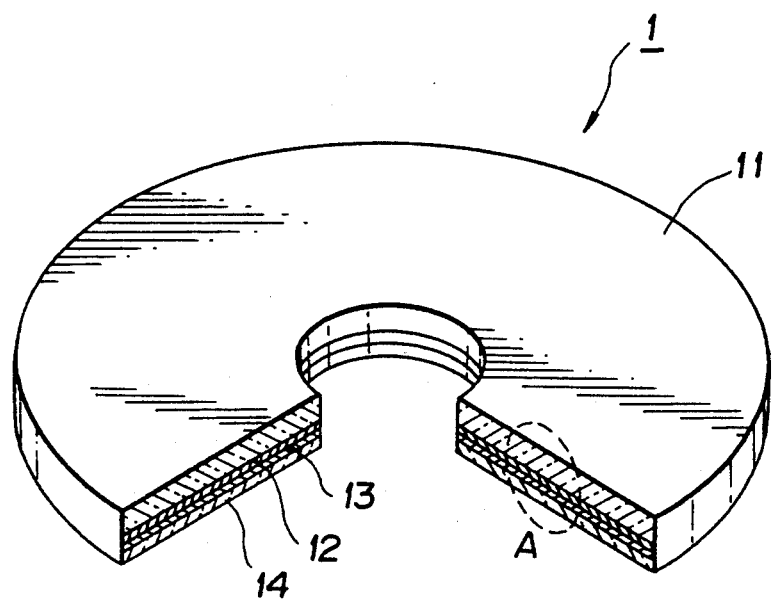
FIG. 1 is a schematic perspective view, partially cut away, of an optical recording medium according to the present invention.
Figure 2:
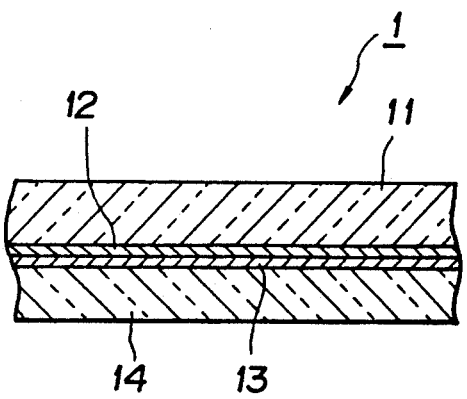
FIG. 2 is an enlarged view of the cut-out surface A of the optical recording medium of FIG. 1.

Referring to FIG. I, showing a perspective view of an optical recording medium, partially cut away, according to the present invention, the optical recording medium 1 is composed of a light transmissive substrate 11, a light absorption layer 12 formed on the substrate 11, a light reflecting layer 13 further formed thereon, and a protective layer 14 further formed thereon.

It is preferred to form the light transmissive substrate 11 with an injection molded resin substrate, on view point of the improvement of the productivity, made of a transparent substance such as polyolefine resin, polycarbonate (PC) resin or polyethylmethacrylate (PMMA) resin, so as to have a thickness of about 1.0 to 1.5 mm. Within these substances, the polyolefine resin will be preferably utilized on the view point of anti-solvent.

The light absorption layer 12 formed on the light transmissive substrate 11 of the character described above contains a cyanine type dye having the following structural formula.

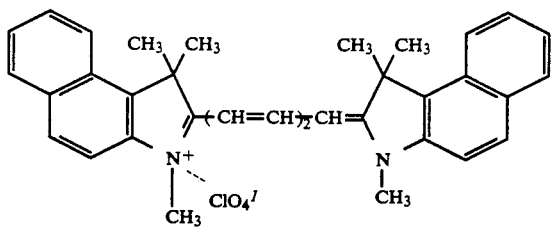

In addition, the light absorption layer 12 according to the present invention further contains a quencher represented by the following general formula [I].

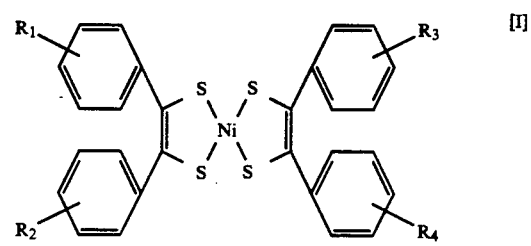

In the above general formula [I], $R_1$, $R_2$, $R_3$ and $R_4$ respectively represent hydrogen or substituent group such as
$CH_3O-$, $CH_3OCH_2CH_2O-$, $(n-C_3H_7)_2N-$, $(C_2H_5)_2N-$ and $Ce-$.

While as concrete examples of the quenchers, those having the following structural formulas [Q-1] to [Q-4] will be provided.

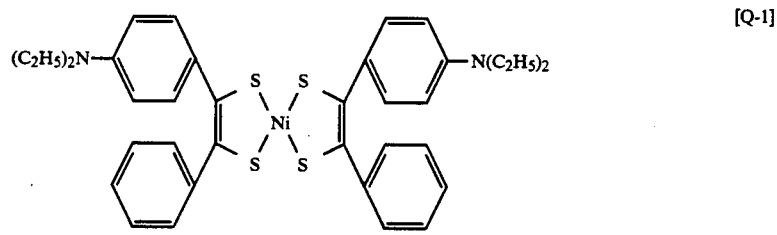

[Q-1]

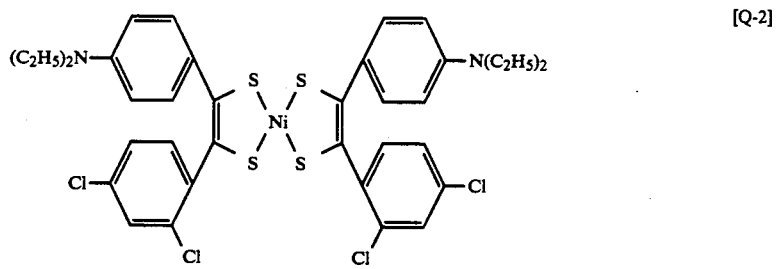

[Q-2]

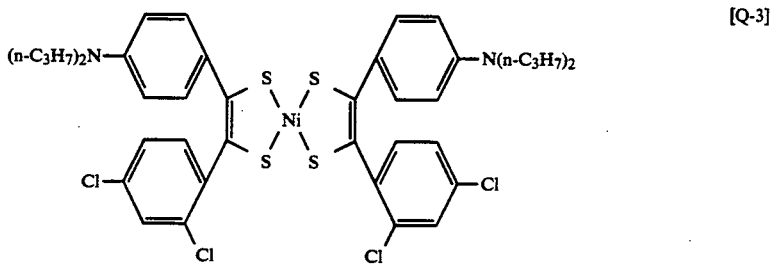

[Q-3]

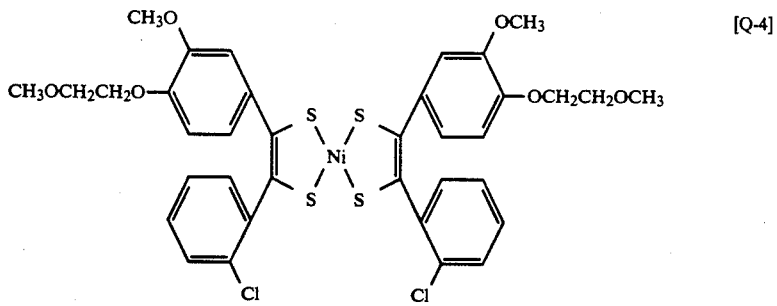

[Q-4]

Within these quenchers, the quencher having the structural formula [Q-1] is most preferred on the view point of the effective prevention of the optical degradation of the cyanine type dye. The quencher having such a structural formula [Q-1] can prevent the optical degradation of the dye, and more particularly, is utilized for preventing the decoloring (reproduction degradation) due to the read-out light. It is desired to contain the quencher of about 0.01 to 10 mol with respect to the dye of 1 mol.

The light absorption layer 12 contains the quencher, and the cyanine type dye of the characters described above is coated on the substrate 11 by a usual means such as a spin-coat method with a thickness of about 20 to 2000 nm. In this spin-coat method, a known solvent is utilized such as diaceton alcohol, ethyl cellosolve, methyl cellosolve, isophorone, methanol, tetrafluoropropanol and dichloroethane.

The light reflecting layer 13 formed on the light absorption layer 12 of the characters described above is composed of metal such as gold (Au), silver (Ag), copper (Cu) or aluminium (Al). The light reflecting layer 13 is formed in a film state on the light absorption layer 12 by one of various vapor deposition methods such as vacuum evaporation, spattering, and ion-plating methods so as to have a film thickness of about 0.02 to 2.0 μm.

The protective layer 14 is usually provided on the light reflecting layer 13 for protecting the light absorption layer 12 and the light reflecting layer 13. The light protective layer 14 is generally formed by effecting a spin-coat of an ultraviolet setting resin on the light reflecting layer 13 and then irradiating the ultraviolet ray thereby to harden the coated film of the ultraviolet setting resin. An epoxy resin, an acrylic resin, a silicone resin, an urethane resin or the like may be used for the substance of the protective layer 14 other than the above ultraviolet setting resin. It is usually desired for the protective layer to have a thickness of about 0.1 to 100 μm.

An intermediate layer may be provided between the light transmissive substrate 11 and the light absorption layer 12 to protect the substrate 11 from the solvent. Furthermore, a further intermediate layer may be provided between the light absorption layer 12 and the light reflecting layer 13 for improving the efficiencies of the light absorption and the light reflection.

With the optical recording medium of the present invention having the characters described above, a recording light is generally irradiated in pulse mode while rotating the recording medium. During this process, portions of the light absorption layer 12 are dissolved and removed thereby to form pits. The pits formed in this manner are read by detecting the difference of the light amount between the incident light and the reflected light of the read-out light.

Concrete examples will be described hereunder for a further understanding of the present invention.

For the concrete examples, the cyanine type dye of the characters described above was used as the dye contained in the light absorption layer and the quencher having the structural formula [Q-1]. These cyanine type dye and the quencher were dissolved in the solvent of ethyl cellosolve, respectively, which was then coated with the thickness of 100 nm on the polyolefine substrate having a diameter of 120 mm and a thickness of 1.2 mm.

For the substrate was used a substrate on which a spiral groove (groove pitch: 1.6 μm; groove width: 0.6 μm; groove depth: 800 A) was preliminarily formed by an injection molding method. A light reflecting layer composed of Au was formed on the light absorption layer by the vacuum evaporation method with a thickness of 1000 A. A protective layer made of photopolymer was further formed on the light reflecting layer, thereby to prepare the sample of the optical recording medium according to the present invention.

An EFM (Eight to Fourteen Modulation) signal was recorded on this sample of the optical recording medium under the following conditions.

EMF Signal Recording Condition

Wavelength: 778 nm
Linear Velocity: 1.4 m/s
Write Power: 6.5 mW
Read Power: 0.5 mW Reproduced signal obtained (at positions near the medium radius r=30 mm) by the recording medium recorded with the above conditions are shown in the following Table 1.

TABLE 1

| $I_{top}$ (V) | $I_{11T}/I_{top}$ (%) | $I_{3T}/I_{top}$ (%) |
|---|---|---|
| 0.508 | 72.4 | 47.4 |

In the above Table 1, $I_{top}$ represents a potential at a portion having a most bright 11 T (196 KHz) amplitude in the recording signal, and $I_{11T}$ and $I_{3T}$ represent the 11 T (196 KHz) amplitude and 3 T (720 KHz) amplitude, respectively.

Evaluations were conducted in relation to the optical recording medium sample on the basis of the measured values shown in the Table 1. As the result of the evaluations, it becomes clear that the following conditions are required to be satisfied in order to conform the reproduced signal to the CD format.

1. It is required for the $I_{top}$ to be more than 0.4 V under the above recording-reproducing conditions;

2. It is required for the ratio of $I_{11T}/I_{top}$ to be 60% or more; and

3. It is required for $I_{3T}/I_{top}$ to be more than 30% and less than 70%.

In the judgment from the above view points, it is found that the sample of the present invention has adequate moderation rate with respect to both the 3 T and 11 T.

The following experiment was carried out for the evaluation of the durability against the optical degradation of the recording medium.

For the concrete examples, the cyanine type dye of the characters described above was used as the dye contained in the light absorption layer and the quencher having the structural formula [Q-1] or the following [Q*] was used. These cyanine type dye and the quencher were dissolved in the solvent of 1, 2-dichloroethane, which was then coated with a thickness of 100 nm on the polyolefine substrate having a diameter of 120 mm and a thickness of 1.2 mm. The dye and the quencher were mixed with the mixing ratio of dye 7 mol and quencher 1 mol. In thus manner, three kinds of samples of the optical recording mediums such as shown in the following Table 2 were prepared.

Dye

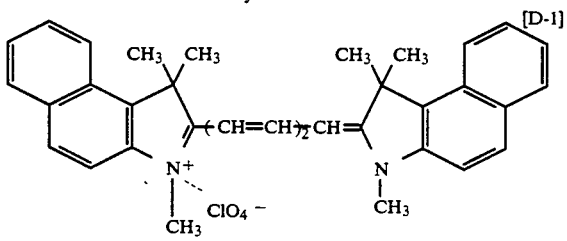
[D-1]

Quencher

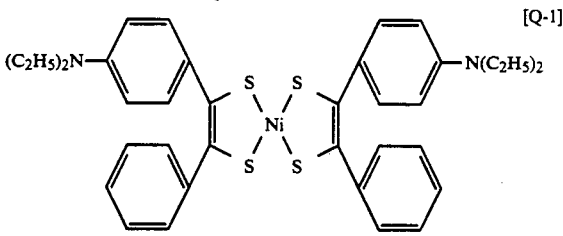
[Q-1]

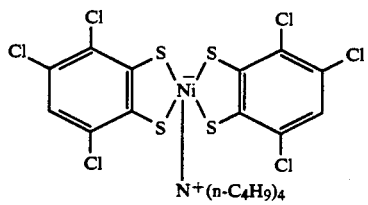
[Q*]

TABLE 2

| Sample No. | Dye | Quencher |
| --- | --- | --- |
| 1. Present invention | D-1 | Q-1 |
| 2. Comparative sample 1 | D-1 | Q* |
| 3. Comparative sample 2 | D-1 | — |

The light stability characteristics of the three kinds of the optical recording mediums thus prepared were evaluated in accordance with the following manner.

Evaluation

Figure 3:
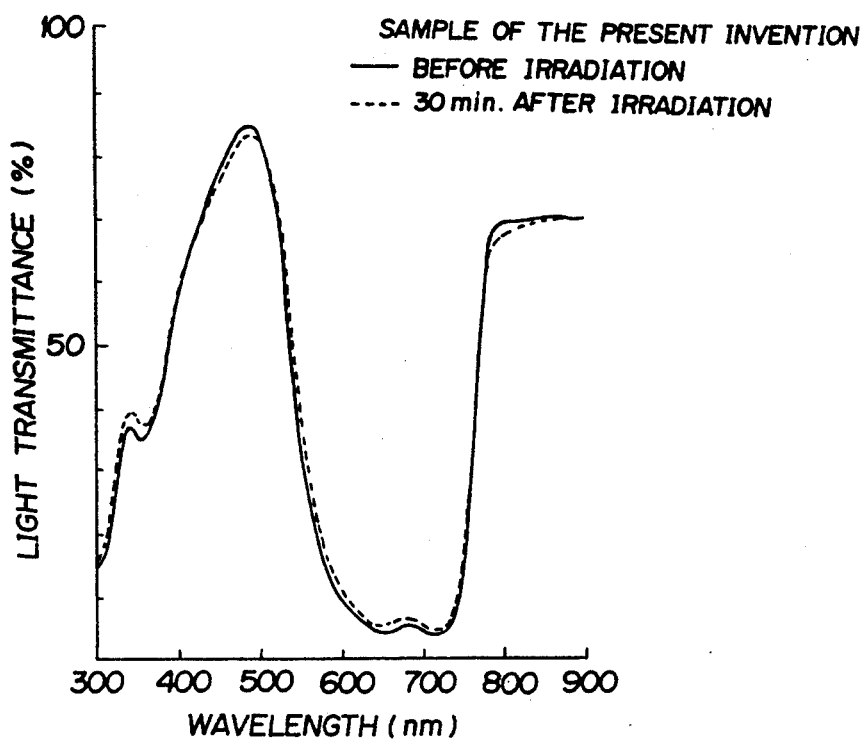
FIG. 3 is a graph representing the transmittance of the light absorption layer with elapse of time of sample according to the present invention.
Figure 4:
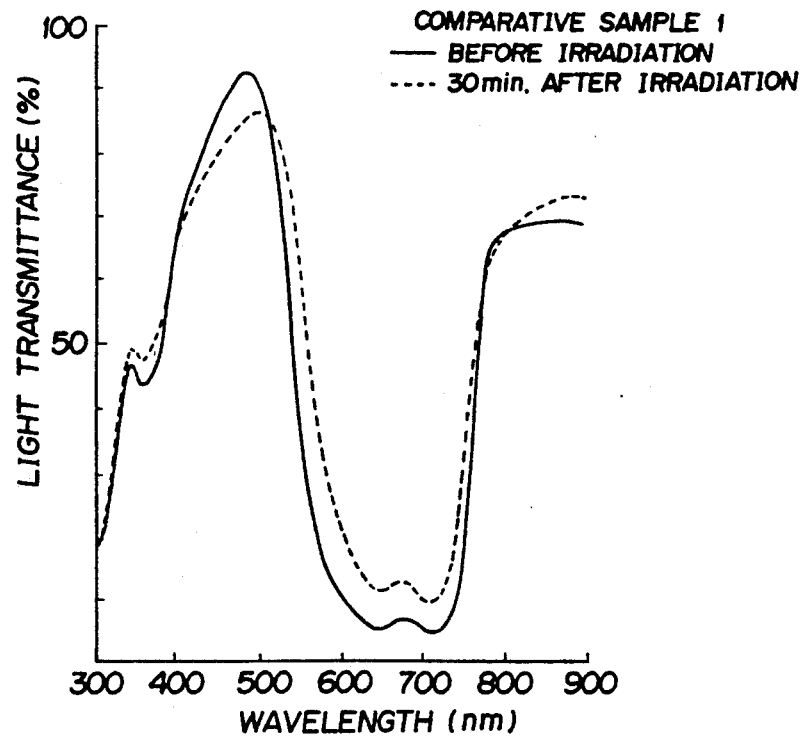
FIGS. 4 and 5 are graphs representing the transmittance of the light absorption layers with elapse of time of comparative samples, respectively.
Figure 5:
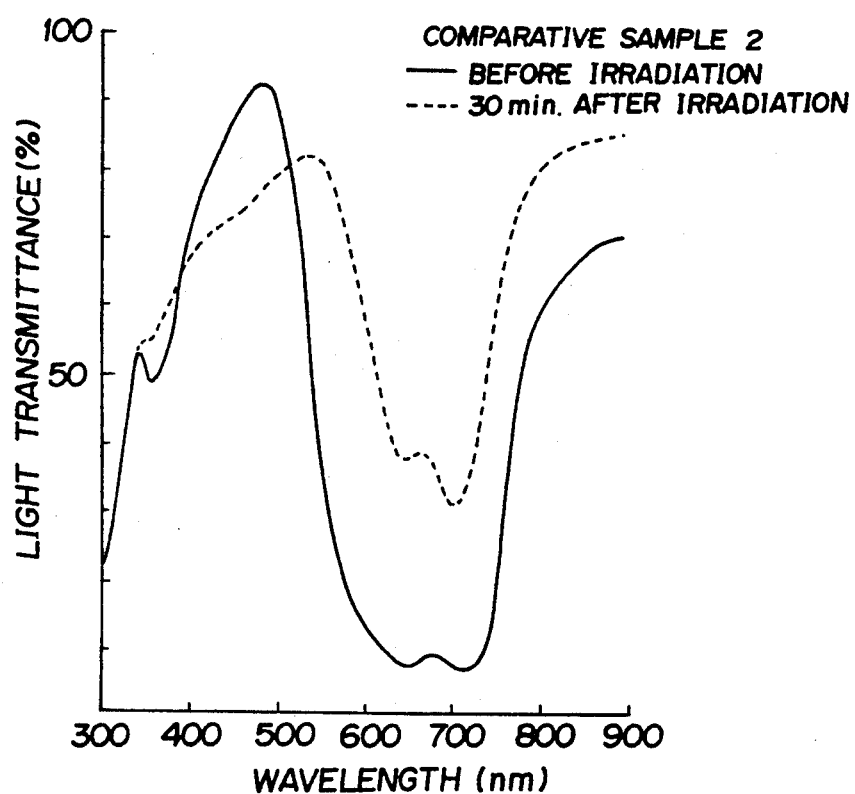

The Xenon lamp lights (wavelength: 400 to 900 nm and energy: 2.7 W/spot) were irradiated from the light absorption layer side, and the variation or change of a transmittance at times before and after the irradiation were measured by a spectrophotometer with the elapse of time. In a result of the measurement, it was observed that the light absorption ability of the dye was reduced in accordance with the degradation of the dye due to the irradiation of the xenon lamp light and the transmittance was hence increased. The variation or change of the transmittance are represented by graphs of FIGS. 3 to 5, in which the graph of FIG. 3 represents the sample based on the present invention and the graphs of FIGS. 4 and 5 represent the samples based on comparative samples 1 and 2, respectively.

As can be understood from these graphs, it is found that the sample of the quencher according to the present invention attain extremely remarkable result for the prevention of the optical degradation of the dye.

What is claimed is:

1. An optical recording medium which can be applied to a compact disc comprising:

a light transmissive substrate having a thickness of 1.0 to 1.5 mm;

a light absorption layer provided on the light transmissive substrate and having a thickness of 20 to 2000 nm;

a light reflecting layer provided on the light absorption layer and having a thickness of 0.02 to 2.0 μm;

a protective layer provided on the light reflecting layer and having a thickness of 0.1 to 100 μm; and said light absorption layer containing a cyanine dye:

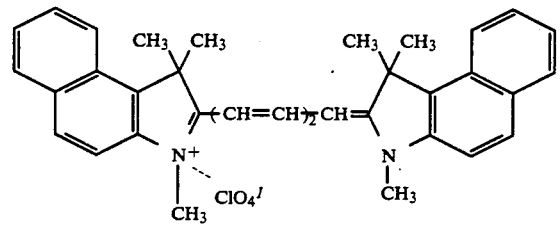

and a quencher:

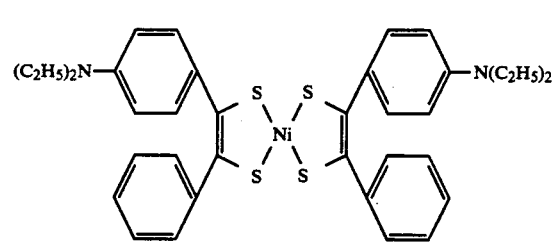

2. An optical recording medium according to claim 1, wherein the quencher is contained by 0.01 to 10 mol with respect to the cyanine type dye of 1 mol.

3. An optical recording medium according to claim 1, wherein the light reflecting layer contains at least one metal selected from the group consisting of gold (Au), silver (Ag), copper (Cu) and aluminium (Al).

* * * * *